(12) United States Patent
Tessier

(10) Patent No.: US 8,681,808 B1
(45) Date of Patent: Mar. 25, 2014

(54) SYSTEM AND METHOD FOR SCHEDULING AN EVENT HAVING NO SET DATE OR TIME

(75) Inventor: Yannick Tessier, Plantation, FL (US)

(73) Assignee: ScheduleClient, LLC, Plantation, FL (US)

( * ) Notice: Subject to any disclaimer, the term of this patent is extended or adjusted under 35 U.S.C. 154(b) by 475 days.

(21) Appl. No.: 13/117,594

(22) Filed: May 27, 2011

(51) Int. Cl.
*H04L 12/28* (2006.01)
*H04J 1/16* (2006.01)

(52) U.S. Cl.
USPC ............ 370/431; 370/252; 370/386; 370/260

(58) Field of Classification Search
USPC .................................. 370/252, 386, 260, 431
See application file for complete search history.

(56) References Cited

U.S. PATENT DOCUMENTS

2008/0098297 A1* 4/2008 Sun et al. ...................... 715/234
2010/0180212 A1 7/2010 Gingras et al.

* cited by examiner

*Primary Examiner* — John Pezzlo
(74) *Attorney, Agent, or Firm* — Edwards Wildman Palmer LLP; Howard M. Gitten

(57) ABSTRACT

A system for scheduling an event includes a first computer. The first computer and at least a second computer are in communication with a server. The first computer and second computer input a calendar corresponding to the availability and/or unavailability of a user of the respective first and at least second computer. The server compares the availability of the user of the first computer and the second computer in response to a request from the first computer for an available date and determines a time period and occurrence of an event as a function of a comparison of the first calendar and second calendar.

12 Claims, 5 Drawing Sheets

FIG. 3

May 2011
Availability Window: 5/3/2011 to 5/2/2012

| Sunday | Monday | Tuesday | Wednesday | Thursday | Friday | Saturday |
|---|---|---|---|---|---|---|
| | 1 | ⓥ 2 | ⓥ 3 ⓥ | ⓥ 4 ⓧ | ⓧ 5 ⓥ | ⓧ 6 ⓥ | ⓥ 7 ⓥ |
| ⓥ 8 ⓥ | ⓧ 9 ⓥ | ⓧ 10 ⓥ | ⓥ 11 ⓧ | ⓥ 12 ⓥ | ⓥ 13 ⓥ | ⓥ 14 ⓥ |
| ⓥ 15 ⓥ | ⓧ 16 ⓧ | ⓧ 17 ⓧ | ⓧ 18 ⓥ | ⓧ 19 ⓥ | ⓧ 20 ⓥ | ⓧ 21 ⓥ |
| ⓧ 22 ⓥ | ⓥ 23 ⓥ | ⓥ 24 ⓥ | ⓥ 25 ⓥ | ⓥ 26 ⓥ | ⓥ 27 ⓥ | ⓥ 28 ⓥ |
| ⓥ 29 ⓥ | ⓧ 30 ⓥ | ⓥ 31 ⓧ | | | | |

Instructions: — 200
- 202
- 202a
- 203
- 202b
- 203
- 204

- ⓥ = Available
- ⓧ = Not Available
- ⓥ = Availability Not Specified
- ☐ = Morning (9AM-1PM)
- ▨ = Afternoon (1PM-5PM)

SYSTEM AND METHOD FOR SCHEDULING AN EVENT HAVING NO SET DATE OR TIME

BACKGROUND OF THE INVENTION

This invention is directed to a system and method for automated scheduling of an event for two or more parties, and more particularly, for scheduling an event with no fixed time or date as a function of the availability of the attendees.

Scheduling and reservation systems are well known in the art. Online automated scheduling systems are known such as travel reservation systems in which a user may utilize a distributed network such as the internet or automated telephone networks to schedule a plane flight, train trip, theater tickets or even a hotel room. These systems have been quite satisfactory. However, they only offer the ability to schedule events which occur at a known time, date and place. Therefore, the user is subject to the restrictions placed upon the event for which they want to participate by some initial scheduler of flights, train trips, theater tickets or hotel.

There are scheduling devices such as those provided by Organizer wherein one person scheduling a meeting may announce the meeting to required attendees and await the decline or accept indicators from those attendees before determining whether the meeting must be rescheduled. Although somewhat better at being adapted to a meeting with no fixed time or date, these types of scheduling systems suffer from a disadvantage that time and effort must be invested to coordinate the various schedules of those who are needed at any meeting. This method also suffers from the disadvantage that to some extent it requires users to chase each attendee to identify, through iterations of invites, to mutually find a common open date and time. The more attendees required for a specific meeting, the more time and effort must be invested by each of the participants until all necessary participants can determine a common free date and time.

By way of example, when attempting to schedule a service call at the home of an individual, the homeowner must coordinate their schedule and availability at their home with that of the person offering the service. This may require a series of exchanged voicemails, telephone conversations, and/or e-mails. Even then, service providers often "hedge their bet" by providing large windows of several hours in which they may show up. This is so that they can compensate for other events in their schedule or keep their calendar sufficiently flexible to allow for scheduling additional events which may arise between the booking of the service and the scheduled meeting.

This issue becomes even more exacerbated in a situation such as court ordered mediation in multi party litigation. The work week calendar of litigators fills rapidly with client meetings, court attendance and mediation. Lawyers have to make themselves available for all of these, and while attending court, participating in a mediation or meeting with a client, they are not available to answer phones or address e-mails. As a result, it becomes difficult to coordinate when and where there is a free time and location to coordinate the desired mediation. Lawyers may often end up chasing each other for weeks to agree on a date and then canceling that date even when agreed.

Accordingly, a method and system which overcomes the shortcomings of the prior art by enabling users to schedule meetings for an event with no set place or time is desired.

SUMMARY OF THE INVENTION

A system for scheduling an event includes a first computer and a second computer. The first computer and second computer are in communication with a server. The first computer and second computer input to the server a calendar corresponding to the availability and/or unavailability of a user of the respective first and second computer. The server compares the availability of the user of the first computer and the second computer in response to a request from the first computer for an available date, and determines an available time period for the occurrence of an event as a function of the comparison of the first calendar and second calendar.

BRIEF DESCRIPTION OF THE DRAWINGS

Other objects, features and advantage of the present invention will be apparent from the written description and the drawings in which:

FIG. 3 is a representation of a screen shot for indicating availability to the server in accordance with the invention;

DETAILED DESCRIPTION OF THE PREFERRED EMBODIMENTS

Figure 1:
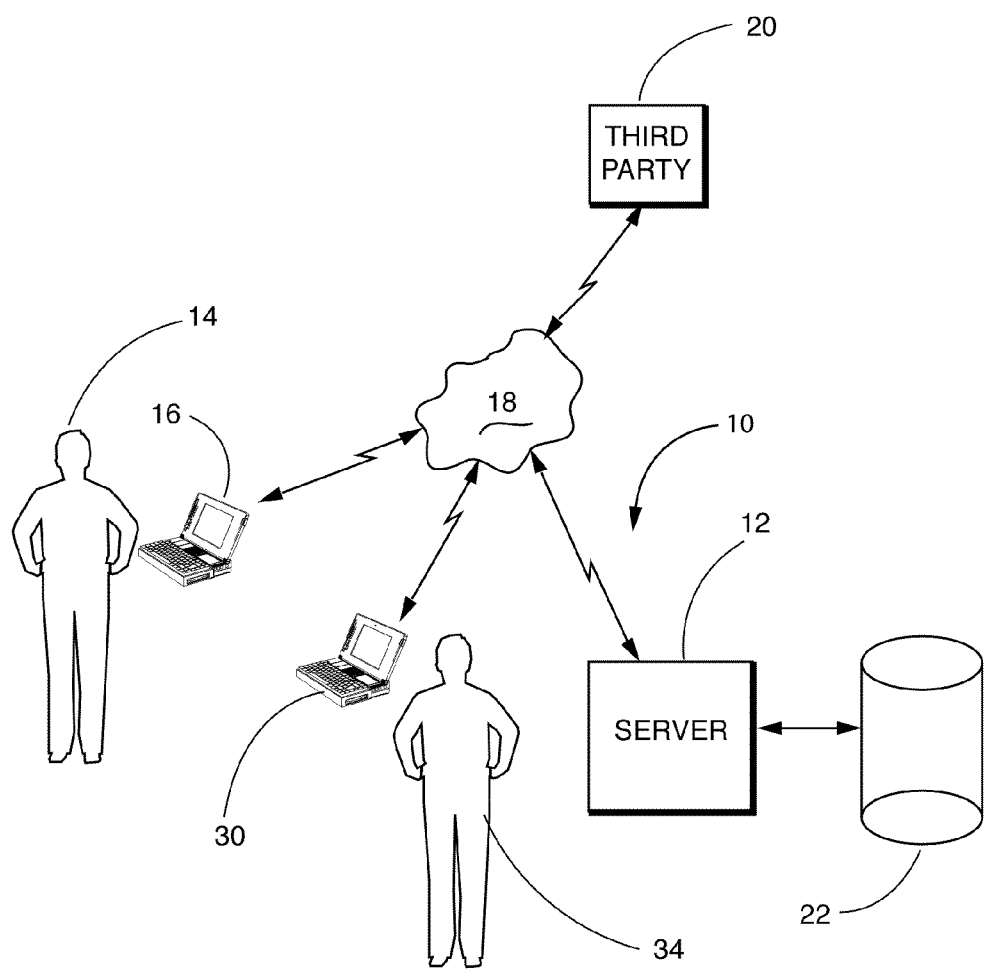
FIG. 1 is a block diagram of a distributed network operating in accordance with the invention.

Reference is had to FIG. 1 in which a system, generally indicated as 10, is provided which enables scheduling of an event without a fixed date or time amongst two or more users 14, 34. System 10 includes a server 12 operatively communicating with a database 22. Server 12 communicates with a first user 14 through a first computer 16 through internet 18. Server 12 also communicates with a second user 34 through a second computer 30 through internet 18. Server 12 also communicates with third party databases 20, such as a calendar database or a computer for a service provider such as a mediator, a repairman or any other type of service provider available, but at an unknown time or date, i.e. a floating schedule.

In a preferred embodiment, server 12 provides an interactive web based portal such as a web page for interacting with users 14, 34. However, it should be noted that computers 16, 30 may be any interactive device which allows each of first user 14, second user 34 and third party 20 to interact with each other utilizing the functionality described below. It should be noted that the preferred embodiment is an internet based system to facilitate the use of server 12 and third party database 20 with its associated servers. However, the computing device may be anything compatible with scheduling calendars and the transmittal of a calendar and capable of such communication utilizing either the Internet, telephone, cable TV, handheld personal data accessories or smart cellular phones by way of nonlimiting example.

It should be understood as well, that all of the functionality described below is capable of being performed by server 12 utilizing data stored at database 22. However, as a result of the use of a distributed network, such as distributed network 10, it is contemplated that certain data and certain functionality may also be provided by additional third party 20 platform.

Server 22 stores data required to schedule meetings. By way of nonlimiting example, database 22 may store a list of desired service providers such as mediators, handymen, or the like and their respective availability schedules. It may also, by way of nonlimiting example, include information of users of the system who make use of the system to schedule an event. By way of example, each of user 34 and/or the service provider user 14, may have a profile stored in database 22 with contact information such as phone number, e-mail address, geographic location, including but not limited to street address or merely a zip code, as well as preference on availability; such as mornings as opposed to afternoon, telephonic as opposed to in person, and even an ID number. As will be discussed below, the calendar indicating availability of each user may also be stored in database 22.

Figure 2:
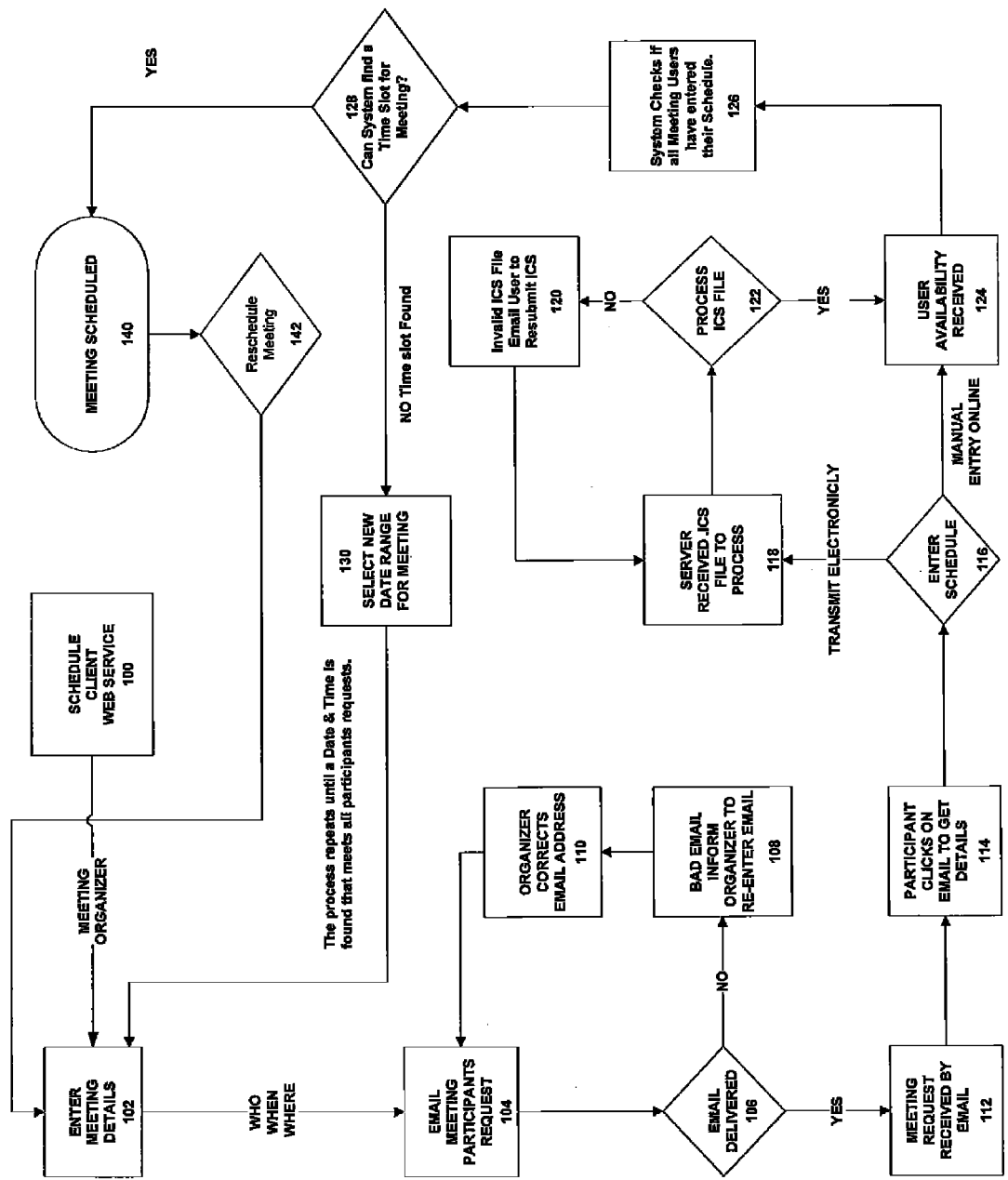
FIG. 2 is a flow chart for the method of scheduling an event in accordance with the invention.

Reference is now made to FIG. 2 wherein the method for interacting across the distributed system in accordance with the invention is provided. In a first step 100, a user 14, by way of example, will access server 12 in a step 100 at a server website. User 14 would be the meeting organizer; the person initiating the scheduling of the event. In a step 102, the meeting organizer, in this case user 14 enters the meeting details at computer 16 and transmits these details to server 12. The details may include the nature of the event, dates for which user 14 is available, and a proposed place. In a preferred non-limiting embodiment, determining when to schedule an event is not the selection of a specific date, but a time period having a plurality of specific time and dates therein, such as a two week period or one business week. Entering the information for meeting location may include a telephone number to a telephonic conference call, or an address such as the address of one of the participants or a neutral site.

In a step 103, who is to be invited is sent to server 12. Determining who is to be invited may include selecting a single participant such as the service provider or multiple participants such as necessary parties to a mediation such as selecting a mediator from a list of mediators stored in database 22 or inviting a specific mediator to the event. Server 12 operating on data stored in database 22 may determine the role of each participant by their title. Either organizer 14 or user 34 may identify the roles of each invited participant. As a function of these roles, server 12 determines whether that participant is authorized to invite others. For example, a general contractor invited to provide a service may be authorized to invite subcontractors to an appointment where services are needed. However, those subcontractors, given their titles and roles, would not be authorized to invite others. Similarly, during a mediation, attorneys are authorized to invite other participants such as the actual parties, experts, paralegals or the like. Server 12 may enable an invite functionality at the remote computer of each authorized user 14, 34 to allow these participants to invite others. In an alternative embodiment, organizer 14 may identify those parties with authorization to server 12, and server 12 acting on that authorization enables functionality at the remote computers 30 to invite others for those specifically identified users.

A request is e-mailed to the participants by server 12 in step 104, the request includes the subject matter (reason for meeting) and a request for availability of the recipient; user 34. In a step 106, it is determined whether the e-mails are delivered. If not, in a step 108 it is determined whether a bad e-mail was utilized, and if so, the server 12 notifies user 14 at first computer 16 that an incorrect e-mail address was used. The organizer takes corrective action in a step 110 and the process is repeated at step 104.

If the e-mail is delivered, in a step 112 second user 34 receives the meeting request from server 12 at the at least second computer 30. In a step 114, second participant 34 receives the meeting details and a request for a response.

In a step 115, those participants authorized in step 103 may add additional participants. If participants are added, then the process returns to step 103 to invite additional participants and proceeds to step 116 where scheduling would begin for the initially invited participants.

In a step 116, the second participant 34 enters their availability schedule during the indicated time period into computer 30. The user 34 may enter their time in one of several ways; manually, uploaded iCalendar file, or store availability data in database 20.

User 34 may manually enter their availability in a step 114 in which the user manually enters their availability utilizing a web portal provided by server 12 such as an online availability toolbar as seen in FIG. 3. An online portal in the form of a calendar tool generally indicated as 200 is provided. Individual dates within the time period are graphically provided on the calendar. Each date block representation 202 is subdivided into specific time blocks such as, by way of non-limiting example, morning 202a and afternoon 202b. User 34 may then indicate their availability by placing a symbol corresponding to availability such as a check or a green indicator in each of the available time slots during the period and their unavailability by putting a red check or a "x" in those sub-time periods 202a, 202b for which they are not available. This information is then sent to server 12 for storage in database 22 and later processing. It should be noted in utilizing the tool, each participant inputs their own availability, and does not have access to the availability calendar of the other parties.

Alternatively, a user 34 may electronically transmit a calendar to server 12 utilizing a calendar tool provided by server 12, so that their calendar is continuously stored and updated, i.e., users 14 and 34 may use system 10 as their calendar rather than other cloud based products.

Figure 4:
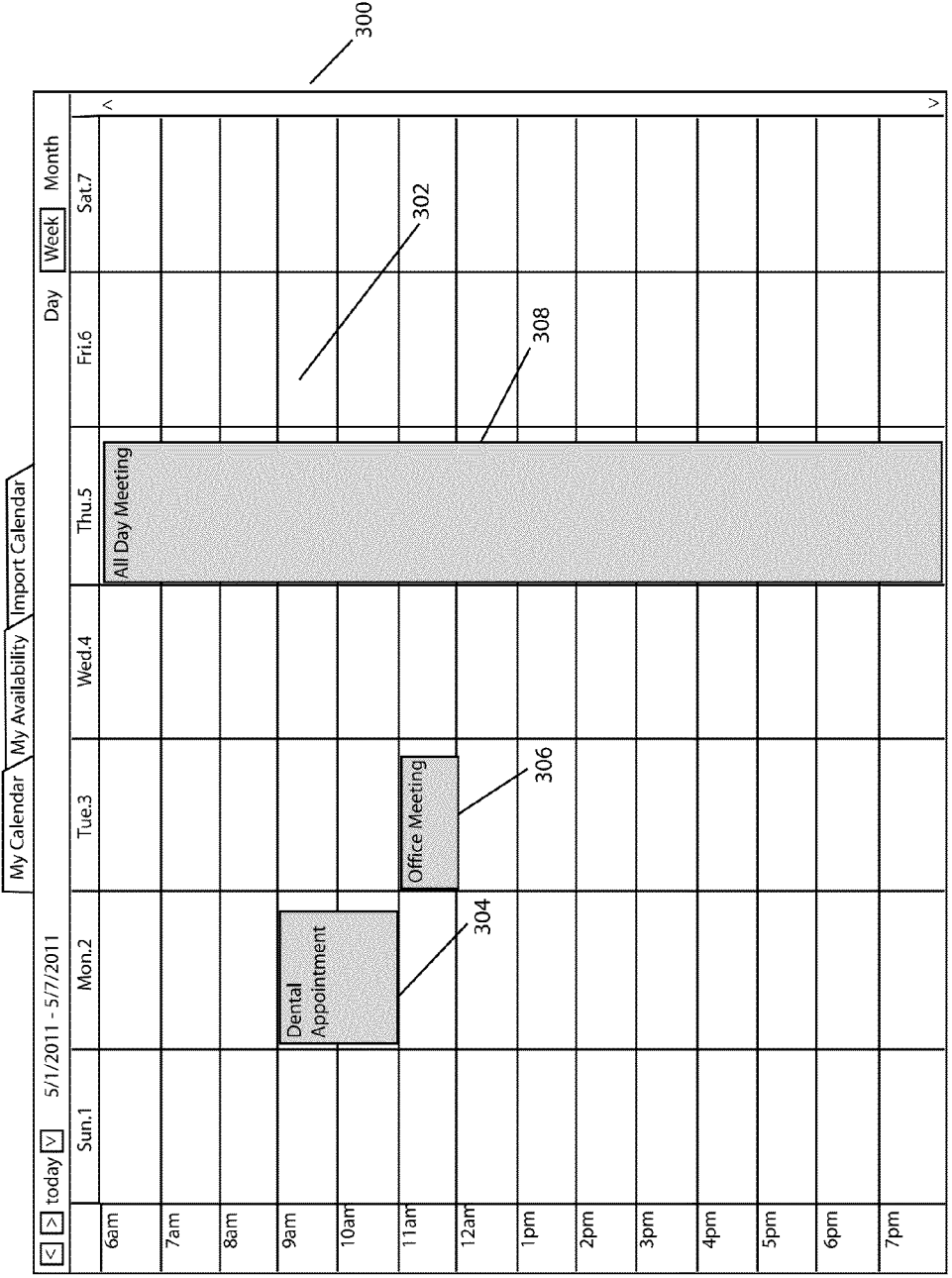
FIG. 4 is a screen shot for indicating to the server availability for an event in accordance with a second embodiment of the invention.

Lastly, a calendar such as that shown in FIG. 4 as calendar 300 which may be a user's own calendar stored with a calendar tool such as Organizer® calendar tool or any other calendar tool capable of being transmitted as an iCalendar file may be utilized. An iCalendar file is a computer file format allowing internet users to send meeting requests and tasks to other users via e-mail or the sharing of files with extensions of .ics. Calendar 300 allows for a more detailed, or granular, scheduling as the actual minute by minute availability of user 34 is stored in the calendar. For example, a two hour dental appointment 304, a one hour office meeting 306, or an all day meeting 308 can be stored in the individual day blocks 302. This file may then be transmitted to server 12 in a step 118 by conversion of the visual representation of calendar 300 into an .ics file. User 34 can transmit their iCalendar data via the internet through FTP, WebDAV or by e-mail. In this input method, as with all of the input methods discussed herein, each user only has access to their own calendars. Server 12 has access to each calendar and performs the comparison while maintaining anonymity.

Once the respective calendar data is received at server 12 in a step 118 from all of the members, the .ics or other file type is processed in a step 122. If invalid, then step 120 returns the process to step 118. If server 12 determines that the data is valid, then the process progresses to step 124. In a step 126, server 12 determines whether all invited participants have entered an availability calendar.

Once all participants have submitted availability data, in a step 128, it is determined whether or not there is in fact a time slot available and server 12 determines the date earliest in time, that is available to all participants and the meeting is scheduled in a step 140. All participants are informed of the logistics of the meeting such as when and where and that time period is locked by the server 12 in the calendar data stored in database 22. Server 12 may also send schedule data regarding the meeting to participants, such as is known in the art, to lock the date on each individual's calendar. If no common overlapping time slot is found within the designated time period, server 12 notifies first participant 14 that no such time slot is available and in a step 130 user 14 must request a new time slot in step 130 and the process returns to step 102 with a new available time slot request.

Often, there may be an available date for all but one of the invited users. Rather than reschedule for every user, it is often more expeditious to determine whether or not the lone unavailable person can change their calendar. In other words, is the commitment which makes them unavailable, a soft commitment such as a golf game, running an errand, participating in a car pool or the like which can be time shifted, or a trial date, a scheduled doctor procedure, or the like which is harder to shift in time. In this instance, server 12 may notify that lone user 34 by sending an inquiry to user 34 at their remote computer 30 requesting whether user 34 could reschedule their appointment for the date and time common to the remaining participants, then the meeting could be held before rescheduling the entire event in step 130.

By way of example, four participants are required for a meeting and user 14, as the organizer, sets forth the date range of Jan. 1, 2012 through Jan. 5, 2012, server 12 searches for availability from the received calendar data. If a first participant is only available for all the days except for Jan. 5, 2012, the second participant is only available on Jan. 1, 2012 and Jan. 2, 2012; and the third participant indicates availability for only Jan. 4, 2012 and Jan. 5, 2012, server 12 will send an inquiry to the third user to determine whether or not January 1 or January 2 is available by way of example prior to rescheduling the entire time period in step 102.

It is also contemplated by the present invention that server 12 provides organizer 14 access to the availability schedule of each participant. In this way, organizer 14 may determine whether a single participant is preventing the occurrence of the event. Then organizer 14 may contact the lone participant by email either directly or through server 12; by phone or any other means.

In a further alternative embodiment, where the service provided by the service provider is interchangeable, such as a mediator for mediation or a cable service person for a home repair installation, a list, as discussed above, of several potential service providers of a particular skill set may be stored in a database 22. Therefore, organizer 14 may rank or provide preferences for which mediator is desired. If it turns out that the mediator is unavailable, then unless part of or the organizer 14's profile is to use only a specific service provider, rather than send an inquiry to the mediator to reschedule, server 12 determines which of the available and/or next highest ranked mediators is available on the open dates for the remaining participants.

Furthermore, because the profiles of service providers are provided and the profile for the participants may include a preference for particular identified service providers, once time and date are approved, each of the participants may retain the right to approve or disapprove the selected service provider. By way of nonlimiting example, if in mediation, the defense and plaintiff attorneys may wish to have the right to determine which mediator they would both approve for mediation. Therefore, the availability of a particular mediator may be treated as any other participant in which unavailability controls the schedule of the meeting. Therefore, server 12 may compare the relative rankings of mediators and select the closest match between rank for the highest ranked mediator as ranked by each of the participants. This manner for picking service providers may also work in the home environment where condominium owners requiring service for a common electronic or plumbing problem may vote on a respective plumber, the plumber receiving the most votes and being available on a date receiving the invite from server 12.

As discussed above in step 140, if server 12 identifies an open day available to all participants, server 12 "locks" the date on each participant's individual calendar by placing the event within the online calendar saved in database 22 or sending an email to each participant at their remote computers for manual uploading to their personal self maintained calendar. However, an emergency can occur where at least one participant needs to reschedule or cancel. In a step 142, it is determined whether or not a rescheduling must occur. The participant requiring rescheduling selects a new time period, which may in fact be the original time period corresponding to a second earliest date within the time period to server 12 and the process is repeated at step 102. Furthermore, if a meeting is canceled, server 12 notifies each participant as their respective remote computers that the meeting has been canceled.

In some instances, participants 34, who are not organizer 14, wish to invite persons that they believe are necessary parties, but not necessarily known to the organizer. By way of example in the case of mediation, it may be an expert witness, or the named parties themselves. A defense attorney and plaintiff attorney may wish to invite their clients to the mediation, an expert or other staff attorneys or paralegals, all of which have contact information not known to the organizer 14.

Figure 5:
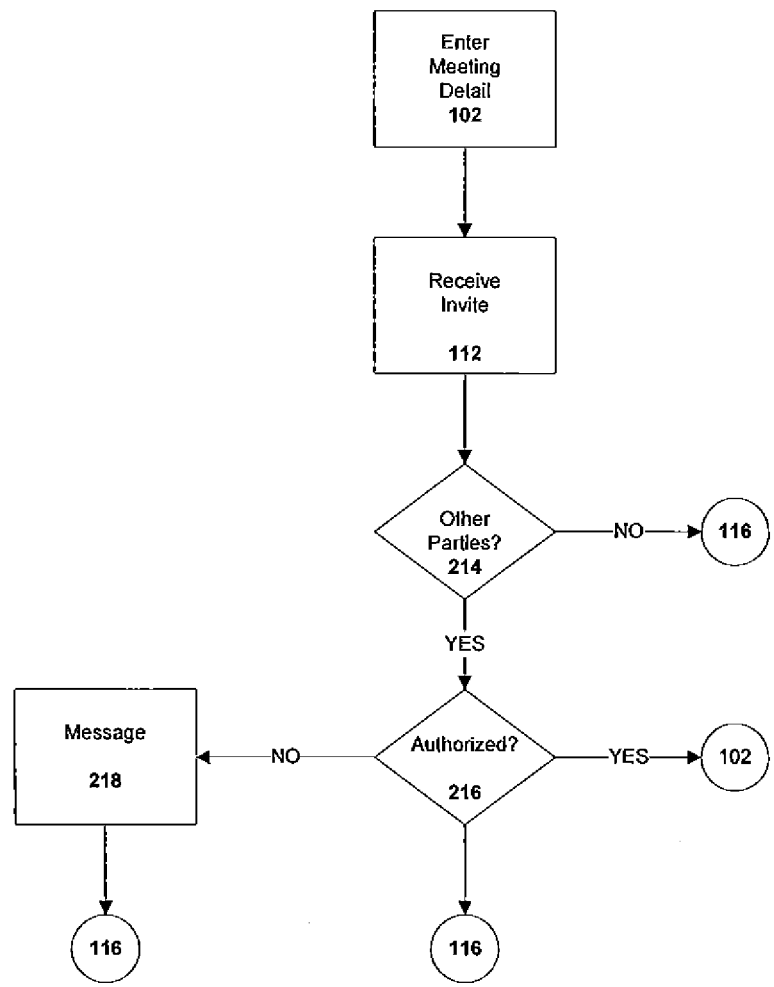
FIG. 5 is a flow chart for the method of scheduling an event in accordance with another embodiment of the invention.

Reference is now made to FIG. 5 in which an embodiment of the invention enabling non-organizer users of the system 10 to invite others to a scheduled event. Like numbers are utilized to indicate like structure. As discussed above in step 102, an organizer 14 enters meeting details. In other steps, through step 112, it is determined whether the necessary participants of the meeting as determined by organizer 14 have received the email. In step 214, a user 34 determines whether or not other parties are necessary for the meeting; parties that organizer 14 either was unaware of or is unable to contact directly. If no other parties are needed, the process returns to step 116 for scheduling. If other parties are needed, server 12 determines whether user 34 is authorized to invite other parties. This authorization may be a function of the role user 34 plays at the meeting, authorizations set up by organizer 14 and sorted in database 22, or a general profile processed by server 12 in accordance with rules. For example, during mediation, parties identifying themselves as attorneys would be allowed to invite others such as parties to the mediation, such as the plaintiff and defendant, necessary witnesses, experts or the like. This authorization may be a function of their role in the mediation as determined by a server 12, or authorizations granted by user 14 in step 102 as part of the meeting detail. If it is determined in step 216 that the requesting party is authorized, then the process returns to step 102 to enter these new invitees as part of meeting details and server 12 repeats the process with respect to those newly added participants. At the same time, the process for the user 34, who is inviting others, continues along the process at step 116.

If the user 34 attempting to invite others is not authorized to invite others, in a step 218, server 12 would provide a message that such addition is unauthorized and that they should contact organizer 34 for permission. The entire process then moves onto step 116.

As can be seen from the above, by providing a system which receives calendar inputs from a first and at least second remote computer corresponding to the availability of participants in the meeting, the meeting has no fixed time or date, it is possible to schedule a meeting for all participants at the earliest open opportunity. Furthermore, by making the server the repository of al calendar information, the process may be done in a way that keeps each participant's overall availability a secret form each other participant. However, it is understood that modifications can be made to the described preferred embodiments of the invention by those skilled in the art. Therefore, it is intended that all matters in the foregoing description as shown in the accompanying drawings may be interpreted as illustrative and not in a limiting sense. Thus, the scope of the invention is determined by the appended claims.

What is claimed is:

1. A system for scheduling an event comprising:
a first computer;
at least a second computer;
a server, communicating with the first computer and at least second computer, the first computer communicating to the server the availability of a first user for an event during a time period, the at least second computer communicating the availability of an at least second user for an event during the time period in response to a request from the server; and
the server comparing the availability of the first user and the availability of the at least second user and determining an earliest time period for an occurrence of an event during the time period as a function of the availability of the first user and the availability of the at least second user.

2. The system of claim 1, further comprising at least a third computer communicating with the server, the at least third computer communicating the availability of an at least third user for an event during the time period, the server comparing the availability of the at least third user, at least second user and first user and determines an earliest time period for the occurrence of the event during the time period.

3. The system of claim 1, wherein at least one of the first computer, and at least second computer transmits the availability electronically to the server in the form of a calendar file.

4. The system of claim 1, wherein the server provides a scheduling portal and at least one of the first computer or at least second computer communicates availability by selecting a time period within the portal.

5. The system of claim 2, wherein the server determines that an earliest time period does not exist.

6. The server of claim 1, where in the server outputs scheduling data to the first computer and at least second computer when the server determines that an earliest time period for the occurrence exists.

7. The system of claim 5, further comprising an at least third computer, the at least third computer communicating the availability of an at least third user for the event during the time period; the server determining that an earliest time period exists for the occurrence of the event during the time period for at least the first user and at least second user and determines that an earliest time period for the occurrence of the event does not exist for the at least third user; the server outputting a change date request to the at least third user.

8. The system of claim 1, further comprising a calendar associated with the first user and an at least second calendar associated with the at least second user, the server causing the earliest time period to be entered on the calendar and the at least second calendar.

9. The system of claim 1, further comprising a database, the data including service provider information, the server communicating with the database and selecting a service provider as a function of the service provider information and the earliest time period.

10. The system of claim 1, further comprising a database, the database storing service provider information, the server communicating with the database and selecting a service provider as a function of the service provider information and the earliest time period; the server communicating a list of service providers to the first computer and at least second computer, and the first computer and at least second computer providing service provider selection information to the server, the server selecting a service provider as a function of the service provider selection information.

11. The system of claim 1, wherein the at least second computer communicates other party information to the server, the server comparing the availability of the first user, the availability of the at least second user, and the availability of an at least other party as a function of the at least other party information and determining the earliest time period for an occurrence of an event during the time period as a function of the availability of the first user, the availability of the at least second user, and the availability of the at least other party.

12. The system of claim 1, wherein the server determines whether a user is authorized to invite other participants and enabling the ability to invite other participants as a function of the determination.

* * * * *